Patented Dec. 25, 1934

1,985,556

UNITED STATES PATENT OFFICE 1,985,556

NEW INTERMEDIATE PRODUCT FOR AZODYESTUFFS

Richard Stüsser, Cologne-Deutz, Germany, assignor to General Aniline Works, Inc., New York, N. Y., a corporation of Delaware No Drawing. Application September 13, 1932, Serial No. 633,018. In Germany September 23, 1931

8 Claims. (Cl. 260—124)

The present invention relates to new intermediate products suitable for the manufacture of azodyestuffs, more particularly it relates to compounds which may be represented by the probable general formula:

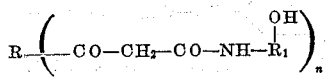

wherein "n" stands for the numbers one or two, "R" stands for a radical of the aliphatic, benzene or naphthalene series, for example, for a methyl group, an ethyl, a propyl, a phenyl or a naphthyl group in case the figure "n" stands for the number one, or for a methylene, ethylene, butylene, phenylene, diphenylene, naphthylene or dinaphthylene radical in case the figure "n" stands for the number two, "$R_1$" stands for a radical of the benzene or naphthalene series, containing as substituent a hydroxy group which is attached either directly to the benzene or naphthalene nucleus "$R_1$", or which may be present in a substituent attached to "$R_1$", and I wish it to be understood that such compounds containing the hydroxy group in the enol form fall within the scope of my invention, for example, such compounds are included in which —NH—$R_1$OH stands for the radical of an amino-phenyl pyrazolone, such as 1-(m-aminophenyl)-3-methyl-5-pyrazolone; as substituents which further may be present in the benzene and naphthalene nuclei of my new compounds, there may be enumerated by way of example, halogen, alkyl, alkoxy and the nitro group.

My new compounds are obtainable by heating one molecular proportion of an acyl acetic ester, such as a methyl or ethyl ester of the general formula:

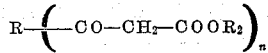

wherein "R" and "n" mean the same as stated above and "$R_2$" stands for a radical of a hydrocarbon, such as methyl, ethyl or phenyl, with one or two molecular proportions respectively of a primary amine of the general formula:

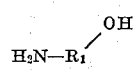

wherein "$R_1$" means the same as stated above.

My new process is advantageously carried out in a solvent, such as chlorobenzene, xylene or solventnaphtha, or in excess acyl acetic ester as solvent.

My new compounds are generally colorless to yellowish colored substances, generally insoluble or difficultly soluble in water, soluble in organic solvents and aqueous alkalies. They are valuable intermediate products for the manufacture of azodyestuffs and are distinguished by being capable of coupling twice or more with diazo compounds.

The invention is illustrated by the following examples, without being limited thereto:

Example 1.—109 parts by weight of 1-amino-3-hydroxybenzene are refluxed in 750 parts by weight of chlorobenzene with 130 parts by weight of acetoacetic ester with stirring. A white, crystalline powder soon separates. After about 20 hour's refluxing, the mass is allowed to cool and the acetoacetic acid-3-hydroxy anilide of the formula:

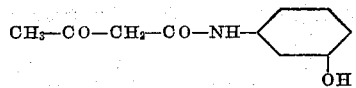

is filtered and purified by recrystallization from alcohol. It is soluble in dilute aqueous alkalies and couples with diazo compounds to form azodyestuffs.

By substituting the 1-amino-3-hydroxybenzene by 143.5 parts by weight of 1-amino-3-hydroxy-6-chlorobenzene, the acetoacetic acid-3-hydroxy-6-chloroanilide having similar properties is obtained.

Example 2.—109 parts by weight of 1-amino-3-hydroxybenzene and 200 parts by weight of acetoacetic ester are heated for about 5 hours at about 150° C. After cooling, the acetoacetic acid-3-hydroxy anilide is filtered and recrystallized from alcohol.

By substituting the 3-hydroxyaminobenzene by a corresponding quantity of 2-amino-7-hydroxynaphthalene, there is obtained the acetoacetic acid-7-hydroxy-2-naphthalide of the formula:

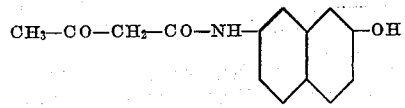

melting at about 210° C. with decomposition.

In an analogous manner there is obtained from 1-amino-5-hydroxynaphthalene and acetoacetic ester the acetoacetic acid-5-hydroxy-1-aminonaphthalide of the formula:

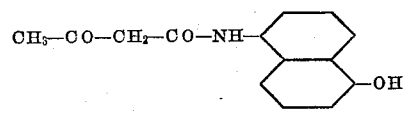

melting at 173° C. with decomposition.

From 1-amino-3-hydroxybenzene and propionyl-acetic acid ethyl ester, there is obtained in an analogous manner the propionyl-acetic acid-3-hydroxyanilide of the formula:

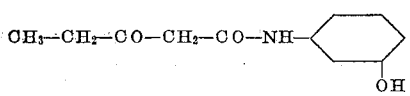

Example 3.—278 parts by weight of 2-hydroxy-naphthalene 3-carboxylic acid-3'-amino-anilide and 150 parts by weight of acetoacetic ester are refluxed in 5000 parts by weight of chlorobenzene in such a manner that the alcohol formed during the reaction is allowed to escape. When the reaction is complete, part of the chlorobenzene is distilled off and the concentrated reaction mixture is allowed to cool. The 2-hydroxy-naphthalene -3- carboxylamino-3'-(aceto-acetylamino) benzene of the formula:

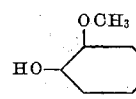

separated is filtered. It is a white powder, soluble in dilute aqueous alkalies and is absorbed from its aqueous solutions by vegetable fibers. The compound absorbed by the fiber can be coupled with diazo compounds free from solubilizing groups, whereby are obtained dyeings fast to washing.

Example 4.—192 parts by weight of benzoyl-acetic ester are refluxed with 109 parts by weight of 1-amino-3-hydroxybenzene in 2000 parts by weight of chlorobenzene for about 30 hours in such a manner that the alcohol formed is allowed to escape. When the reaction is complete, 1000 parts by weight of chlorobenzene are distilled off and the mass is allowed to cool. The benzyl-acetic acid-3-hydroxy-anilide separated in form of colorless crystals and having the formula:

is filtered with suction, washed with chlorobenzene and recrystallized from alcohol.

By substituting the benzoyl-acetic ester by 237 parts by weight of p-nitrobenzoyl-acetic ester there is obtained in an analogous manner the p-nitrobenzoyl-acetic acid - 3 - hydroxyanilide, crystallizing from alcohol in yellowish crystals.

Example 5.—153 parts by weight of terephthaloyl-bis-acetic acid ethyl ester and 109 parts by weight of 1-amino-3-hydroxybenzene are refluxed in 2000 parts by weight of solvent naphtha in such a manner that the ethyl alcohol produced in the reaction distils off. When ethyl alcohol does no more escape about 1000 parts by weight of the solventnaphtha are distilled off. From the cooled mass the terephthaloyl-bis-aceto-3-hydroxyanilide of the formula:

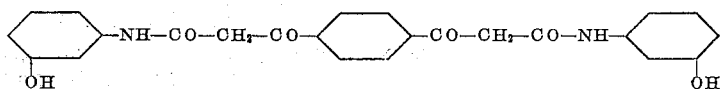

separated is filtered, again dissolved in aqueous caustic soda lye and reprecipitated from the filtered solution by acidification. When dried it is a yellowish powder.

By substituting the 1-amino-3-hydroxybenzene by 123 parts by weight of 1-amino-3-methoxy-4-hydroxy-benzene the terephthaloyl-bis-aceto-3'-methoxy-4'-hydroxyanilide of the formula:

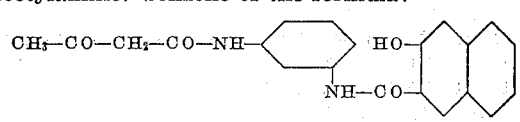

having similar properties is obtained.

By substituting the terephthaloyl-bis-acetic acid ethyl ester by the same quantity of isophthaloyl-acetic acid ethyl ester the isophthaloyl-bis-aceto-3-hydroxyanilide of the formula:

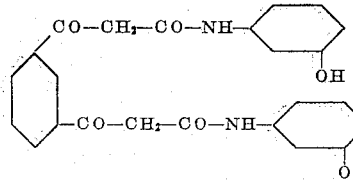

and having similar properties is obtained.

By substituting the terephthaloyl-bis acetic acid ethyl ester by 229 parts by weight of diphenyl-4,4'-di-(carboyl acetic acid ethyl ester) the diphenyl - 4,4'-bis(carboyl - acetyl-amino-3''-hydroxy-benzene) of the formula:

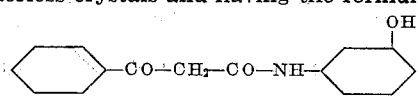

having similar properties is obtained.

From naphthalene-1,5-di-(carboyl acetic acid ethyl ester) and 1-amino-3-hydroxybenzene there is obtained in an analogous manner the naphthalene-1,5 - bis(carboyl-acet-amino-3'-hydroxybenzene) is obtained.

Example 6.—178 parts by weight of benzoyl-acetic acid methyl ester and 348 parts by weight of 2 - hydroxynaphthalene- 3 -carboylamino -4'-amino-2', 5'-dimethoxybenzene are refluxed for about 35 hours in about 5000 parts by weight of chlorobenzene. After this 2000–3000 parts by weight of chlorobenzene are distilled off, and the concentrated reaction mixture is allowed to cool. The condensation product of the formula:

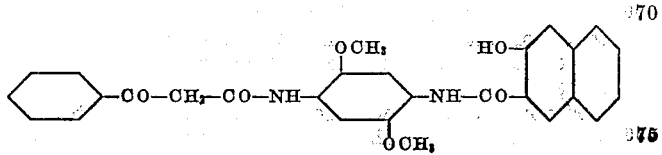

crystallizing in colorless crystals, being insoluble in water and soluble in dilute aqueous alkalies, is filtered.

In an analogous manner there is obtained by refluxing for about 40 hours 306 parts by weight of terephthaloyl-bis-acetic acid ethyl ester and 696 parts by weight of 2-hydroxynaphthalene-3-carboylamino - 4'-amino-2',5'-dimethoxybenzene a condensation product of the following formula:

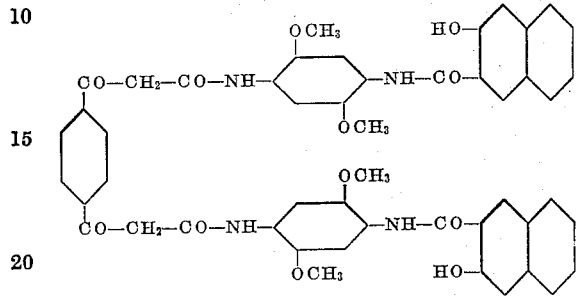

being insoluble in water and soluble in dilute aqueous alkalies.

I claim:
1. The compounds of the general formula:

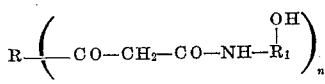

wherein "$n$" stands for one of the numbers one and two, "R" stands for a radical of the aliphatic, benzene or naphthalene series and "$R_1$" stands for a radical of the benzene or naphthalene series, or —NH—$R_1$OH stands for an amino-phenyl-pyrazolone radical, being generally colorless to yellowish colored amorphous substances, generally insoluble in water, soluble in organic solvents and aqueous alkalies and being valuable intermediate products for the manufacture of azodyestuffs.

2. The compounds of the general formula:

$$CH_3—CO—CH_2—CO—NH—R_1—OH$$

wherein "$R_1$" stands for a radical of the benzene or naphthalene series, being generally colorless to yellowish colored amorphous substances, generally insoluble in water, soluble in organic solvents and aqueous alkalies and being valuable intermediate products for the manufacture of azodyestuffs.

3. Aceto acetic acid-3-hydroxyanilide of the formula:

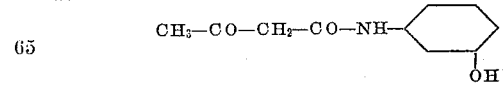

forming colorless crystals, being soluble in dilute aqueous alkalies.

4. The compounds of the general formula:

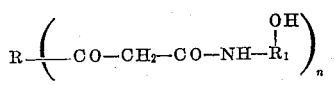

wherein "$n$" stands for one of the numbers one and two, "R" stands for a benzene nucleus and "$R_1$" stands for a radical of the benzene or naphthalene series, being generally colorless to yellowish colored amorphous substances, generally insoluble in water, soluble in organic solvents and aqueous alkalies and being valuable intermediate products for the manufacture of azodyestuffs.

5. A compound of the formula:

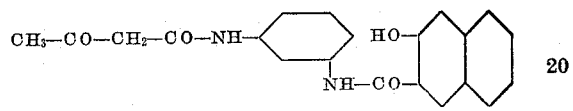

being a white powder, soluble in dilute aqueous alkalies.

6. The compounds of the general formula:

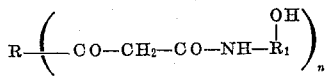

wherein "$n$" stands for the numbers one or two, "R" stands for a radical of the aliphatic, benzene or naphthalene series in case "$n$" stands for the number one, or "R" stands for a radical of the alkylene, phenylene or naphthalene series in case "$n$" stands for the number two, and "$R_1$" stands for a radical of the benzene or naphthalene series or —NH—$R_1$OH stands for an amino-phenyl-pyrazolone radical, being generally colorless to yellowish colored amorphous substances, generally insoluble in water, soluble in organic solvents and aqueous alkalies and being valuable intermediate products for the manufacture of azodyestuffs.

7. The compound of the formula:

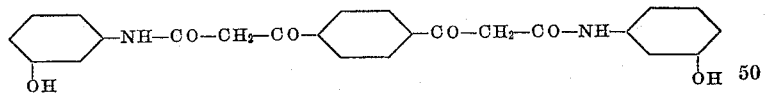

being in its dry state a yellowish powder, soluble in dilute aqueous alkalies.

8. The compound of the formula:

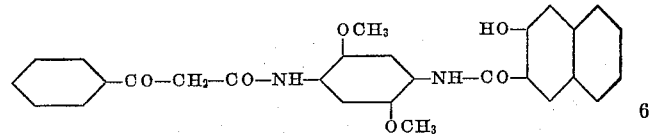

crystallizing in colorless crystals, being insoluble in water and soluble in dilute aqueous alkalies.

RICHARD STÜSSER.